United States Patent [19]
Hirakawa et al.

[11] Patent Number: 6,114,460
[45] Date of Patent: Sep. 5, 2000

[54] METHOD FOR PRODUCING GRAFT COPOLYMER RUBBER AND POLYPROPYLENE-BASED RESIN COMPOSITION

[75] Inventors: Manabu Hirakawa, Tsukuba; Shin-ichi Kondo, Ichihara, both of Japan

[73] Assignee: Sumitomo Chemical Company, Limited, Osaka, Japan

[21] Appl. No.: 09/079,218

[22] Filed: May 15, 1998

[30] Foreign Application Priority Data

May 15, 1997 [JP] Japan ..................................... 9-125654

[51] Int. Cl.$^7$ .......................... C08F 277/00; C08F 279/00
[52] U.S. Cl. ............................. 525/290; 525/75; 525/240; 525/241; 525/242; 525/244
[58] Field of Search ..................................... 525/322, 289, 525/290, 240, 75, 241, 242, 244

[56] References Cited

U.S. PATENT DOCUMENTS 5,331,046  7/1994  Chang et al. .

FOREIGN PATENT DOCUMENTS

| | | |
|---|---|---|
| 0533776A1 | 3/1993 | European Pat. Off. . |
| 739939A2 | 10/1996 | European Pat. Off. . |
| 57-135845A | 8/1982 | Japan . |
| 60-152539A | 8/1985 | Japan . |
| 62-010565B | 3/1987 | Japan . |
| 1-031847A | 2/1989 | Japan . |
| 6-313077A | 11/1994 | Japan . |

*Primary Examiner*—Duc Truong
*Attorney, Agent, or Firm*—Birch, Stewart, Kolasch & Birch, LLP

[57] ABSTRACT

A method for producing a graft copolymer rubber which comprises graft polymerizing an alkenyl aromatic compound to an ethylene-α-olefin-dicyclopentadiene terpolymer rubber having a Q value of more than 5.0 and Mooney viscosity at 100° C. of 70 or less, in an aqueous suspension in the presence of a free radical initiator and a dispersant, and a polypropylene-based resin composition comprising 5 to 40% by weight of said graft copolymer rubber and 60 to 95% by weight of a polypropylene-based resin(B) selected from the group consisting of a crystalline propylene homopolymer (i) having a Q value of 3.0 to 5.0, isotactic pentad fraction of 0.97 or more and intrinsic viscosity measured in tetralin solution at 135° C. of 0.85 to 1.60 dl/g, a crystalline propylene-ethylene block copolymer (ii) composed of 60 to 95% by weight of apropylene homopolymer portion having a Q value of 3.0 to 5.0, isotactic pentad fraction of 0.97 or more and intrinsic viscosity measured in tetralin solution at 135° C. of 0.85 to 1.60 dl/g and 5 to 40% by weight of a propylene-ethylene random copolymer portion having a Q value of 3.0 to 5.0 ethylene content of 25 to 55% by weight, and a mixture of (i) and (ii).

18 Claims, No Drawings

METHOD FOR PRODUCING GRAFT COPOLYMER RUBBER AND POLYPROPYLENE-BASED RESIN COMPOSITION

BACKGROUND OF THE INVENTION

1. Field of the Invention

The present invention relates to a method for producing a graft copolymer rubber and a polypropylene-based resin composition having excellent rigidity, impact resistance and flowability, containing said graft copolymer rubber. More particularly, the present invention relates to a method for producing a graft copolymer rubber in which an alkenyl aromatic compound is graft-polymerized to a specific ethylene-α-olefin-non-conjugated diene terpolymer rubber, and a polypropylene-based resin composition excellent in rigidity, impact resistance and flowability, containing said graft copolymer rubber.

2. Description of the Related Art

Recently, a polypropylene-based resin (e.g. propylene-ethylene block copolymer) is used for automobile materials and domestic electric appliances materials in view of lightness, low cost and the like. However, the conventional propylene-ethylene block copolymer material has low impact strength, and a high inorganic fillers content for obtaining excellent rigidity and thermal properties such as heat distortion temperature and the like, and therefore has a relatively high specific gravity.

It is proposed that, for improving impact strength, a graft copolymer rubber, in which an alkenyl aromatic compound is graft-polymerized to an ethylene-α-olefin-non-conjugated diene terpolymer rubber, is blended with a propylene-ethylene block copolymer. For example, in JP-A-57-135845 and JP-A-7-104466 propose, it is disclosed that the graft copolymer rubber produced in an aqueous suspension is mixed with a polypropylene-based resin. However, the graft copolymer rubber used has no suitable Q-value and Mooney viscosity, and the polypropylene-based resin into which the graft copolymer rubber is compounded has insufficient impact resistance and flowability.

SUMMARY OF THE INVENTION

An object of the present invention is to provide a method for producing, in an aqueous suspension without adhering rubber particles each other, a graft copolymer rubber which gives a polypropylene-based resin composition having excellent rigidity, impact resistance and flowability when added to a polypropylene-based resin and a polypropylene-based resin composition containing said graft copolymer rubber.

According to the present invention, there is provided a method for producing a graft copolymer rubber which comprises graft polymerizing an alkenyl aromatic compound to an ethylene-α-olefin-dicyclopentadiene terpolymer rubber having a ratio of weight average molecular weight (Mw) to number average molecular weight(Mn) (hereinafter referred to as "Q value") according to a gel permeation chromatography (GPC) method of more than 5.0 and a Mooney viscosity at 100° C. of 70 or less, in an aqueous suspension in the presence of a free radical initiator and a dispersant.

Furthermore, according to the present invention, there is provided a polypropylene-based composition which comprises 5 to 40% by weight of said graft copolymer rubber (A) and 60 to 95% by weight of a polypropylene-based resin (B) selected from the group consisting of a crystalline propylene homopolymer (i) having a Q value of 3.0 to 5.0, isotactic pentad fraction of 0.97 or more and intrinsic viscosity measured in tetralin solution at 135° C. of 0.85 to 1.60 dl/g, a crystalline propylene-ethylene block copolymer (ii) composed of 60 to 95% by weight of apropylene homopolymer portion having a Q value of 3.0 to 5.0, isotactic pentad fraction of 0.97 or more and intrinsic viscosity measured in tetralin solution at 135° C. of 0.85 to 1.60 dl/g and 5 to 40% by weight of a propylene-ethylene random copolymer portion having an ethylene content of 25 to 55% by weight, and a mixture of (i) and (ii) (provided that the total of (A) and (B) is 100% by weight).

DETAILED DESCRIPTION OF THE INVENTION

The present invention will be described in detail below.

As the α-olefin in the ethylene-α-olefin-dicyclopentadiene terpolymer rubber used in the present invention, α-olefins having 3 to 10 carbon atoms such as propylene, butene-1, pentene-1, octene-1 and the like are listed. Among them, in particular, an ethylene-propylene-dicyclopentadiene terpolymer rubber is suitably used.

The ethylene-α-olefin-dicyclopentadiene terpolymer rubber has a Q value (a ratio of a weight average molecular weight (Mw) to number average molecular weight (Mn) [Mw/Mn] according to a gel permeation chromatography (GPC) method of more than 5.0, preferably 6.0 or more, more preferably 7.0 or more and a Mooney viscosity at 100° C. of 70 or less, preferably 50 or less. When the Q value is not more than 5.0, the brittleness temperature of the resulting polypropylene-based composition raises. Further, the rubber tends to adhere each other during graft polymerization, and therefore the polymerization becomes difficult. When the Mooney viscosity at 100° C. is more than 70, a preferable effect is not obtained regarding flowability of the resulting polypropylene-based resin composition.

The above ethylene-α-olefin-dicyclopentadiene terpolymer rubber can be obtained according to a method disclosed in JP-B-43-13052 or JP-A-2-77410, namely can be obtained by copolymerizing ethylene, an α-olefin and further dicyclopentadiene as a third component in an inert organic solvent such as a hydrocarbon with a Ziegler Natta catalyst composed of a vanadium compound, organoaluminum compound and halogenated ester compound.

In the present invention, as the alkenyl aromatic compound to be graft-polymerized to an ethylene-α-olefin-dicyclopentadiene terpolymer rubber, compounds represented by the following general formula are listed.

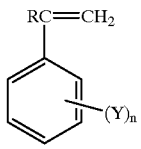

(wherein, R represents a hydrogen atom, an alkyl group having 1 to 6 carbon atoms or a halogen atom; Y represents a substituent selected from vinyl group, a halogen atom, an amino group, a hydroxyl group or an alkyl group having 1 to 6 carbon atoms, and n represents an integer of 0 to 5.)

Examples thereof include styrene, α-methylstyrene, α-chlorostyrene, vinyltoluene, divinylbenzene and the like. Among them, styrene is particularly preferable.

The graft-polymerization of an alkenyl aromatic compound to ethylene-α-olefin-dicyclopentadiene terpolymer rubber is preferably effected, for example, by a method described in JP-B-62-10565, namely an aqueous suspension polymerization method in which an alkenyl aromatic compound is graft-polymerized to ethylene-α-olefin-dicyclopentadiene terpolymer rubber in an aqueous suspension in the presence of a free radical initiator and a dispersant in appropriate amounts.

Examples of the dispersant include polyvinyl alcohols, cellulose compounds, acrylic acid-based compounds, inorganic salts, alkylene oxides and the like. Examples of the free radical initiator include organic peroxides such as benzoyl peroxide, lauroyl peroxide, tert-butyl peroxide pivalate, tert-butyl peroxy-2-ethylhexanoate, tert-butyl hydroxide, dicumyl peroxide and the like, azo compounds such as azobisisobutyronitrile, azobisdimethylvaleronitrile and the like.

The content of the alkenyl aromatic compound in the graft copolymer rubber is not particularly restricted, but preferably from 5 to 30% by weight when used for production of the composition comprising a polypropylene-based resin. The content is more preferably from 10 to 25% by weight, most preferably from 15 to 20% by weight in view of balance between rigidity and impact property of the resulting polypropylene-based resin composition. When the content is more than 30% by weight, a preferable result is not sometimes obtained in balance between rigidity and impact strength of the polypropylene-based resin composition. On the other hand, when less than 5% by weight, the rigidity of the composition sometimes becomes poor.

The polypropylene-based resin (B) used in the present invention is selected from the group consisting of a crystalline propylene homopolymer (i) having a Q value of 3.0 to 5.0, isotactic pentad fraction of 0.97 or more and intrinsic viscosity measured in tetralin solution at 135° C. of 0.85 to 1.60 dl/g, a crystalline propylene-ethylene block copolymer (ii) composed of 60 to 95% by weight of a propylene homopolymer portion having a Q value of 3.0 to 5.0, isotactic pentad fraction of 0.97 or more and intrinsic viscosity measured in tetralin solution at 135° C. of 0.85 to 1.60 dl/g and 5 to 40% by weight of a propylene-ethylene random copolymer portion having an ethylene content of 25 to 55% by weight, and a mixture of (i) and (ii).

The polypropylene-based resin is preferably the crystalline propylene-ethylene block copolymer (ii) or a mixture of the crystallinepropylene homopolymer (i) and the crystalline propylene-ethylene block copolymer (ii) (referred to simply as "propylene homopolymer" and "propylene-ethylene block copolymer", herein-after).

The propylene-ethylene block copolymer can be prepared by polymerizing propylene with a stereoregular olef in polymerization catalyst in the first stage for obtaining said propylene homopolymer portion as the first segment and subsequently copolymerizing propylene and ethylene in the second stage for obtaining said propylene-ethylene random copolymer portion as the second segment.

The propylene-ethylene block copolymer can be produced by a slurry polymerization, gas phase polymerization or the like.

Herein, the propylene-ethylene block copolymer is substantially a composition of the propylene homopolymer portion and propylene-ethylene random copolymer portion.

And, herein, the Q value means a ratio(Mw/Mn) of a weight average molecular weight (Mw) to a number average molecular weight(Mn), indicating a molecular weight distribution according to a gel permeation chromatography (GPC) method.

In the polypropylene-based resin used in the present invention, each of the propylene homopolymer portion of the propylene ethylene block copolymer and the propylene homopolymer has a Q value of 3.0 to 5.0, preferably 3.5 to 4.5. When the Q value is less than 3.0, the flowablity of the composition deteriorates. On the other hand, when the Q value is more than 5.0, the impact strength of the composition sometimes becomes low.

The propylene homopolymer portion of the polypropylene-based resin sometimes indicates both the propylene homopolymer (i) and the propylene homopclymer portion of the propylene-ethylene block copolymer (ii), herein-after.

The preferable propylene homopolymer portion is as follows.

Namely, as described above, the Q value is from 3.0 to 5.0, preferably from 3.5 to 4.5, and the isotactic pentad fraction is 0.97 or more, preferably 0.98 or more. When the isotactic pentad fraction is less than 0.97, it is difficult to obtain a polypropylene-based composition having a desired rigidity, heat resistance and the like.

The intrinsic viscosity $[\eta] P$ measured in a tetralin at 135° C. is from 0.85 to 1.60 dl/g, preferably from 0.90 to 1.40 dl/g. When the intrinsic viscosity $[\eta] P$ is less than 0.85 dl/g, the impact resistance of the composition lowers, and preferable result can not be obtained. The intrinsic viscosity of more than 1.60 dl/g is not preferred because the flowability becomes poor.

The propylene homopolymer portion as the first segment in the propylene-ethylene block copolymer (ii) can be sampled by taking out from a polymerization vessel after polymerization of the propylene homopolymer portion in the first stage, and the content, physical properties and the like thereof can be measured.

The proportion of propylene-ethylene random copolymer portion (EP content) as the second segment in the propylene-ethylene block copolymer (ii) is from 5 to 40% by weight, preferably from 10 to 30% by weight.

The ethylene content $(C2')_{EP}$ of the propylene-ethylene random copolymer portion is preferably from 25 to 55% by weight, more preferably from 30 to 50% by weight. When it is less than 25% by weight or more than 55% by weight, preferable result can not be obtained regarding impact resistance of the composition. The intrinsic viscosity $[\eta] EP$ of the propylene-ethylene random copolymer portion is preferably from 2.5 to 12 dl/g, more preferably 2.5 to 6.5 dl/g, most preferably from 2.8 to 6.0 dl/g. When it is less than 2.5 dl/g, preferable result may sometimes not be obtained in balance between riaidity and impact property. When more than 12 dl/g, granule structure is formed, and preferable result may sometimes not be obtained regarding quality of the surface.

Next, methods for measuring the above various properties are explained below. The isotactic pentad fraction is the fraction of propylene monomer unit existing at the center of the isotactic chain in the form of a pentad unit, in other words, the chain in which five propylene monomer units are successively meso-bonded, in the crystalline polypropylene molecular chain as measured by the method disclosed by A. Zambelli et al. in Macromolecules, 6, 925 (1973) namely by use of a $^{13}$C-NMR spectrum. However, the assignment of NMR absorption peak is based on Macromolecules, 8, 687 (1975) published thereafter.

Specifically, the isotactic pentad fraction is measured as an area fraction of mmmm peak to the total absorption peaks in methyl carbon region of the $^{13}$C-NMR spectrum. When the isotactic pentad fraction of the NPL standard substance CRM No. M19-14 Polypropylene PP/MWD/2, of NATIONAL PHYSICAL LABORATORY in U.K. was measured according to the above-described method, it was 0.944.

In the propylene-ethylene block copolymer (ii), the weight ratio X by weight of the propylene-ethylene random copolymer portion to the total block copolymer can be determined by calculation from the following equation by measuring the quantity of the crystal fusion heat of the propylene homopolymer portion and the total block copolymer.

$$X=1-(\Delta Hf)T/(\Delta Hf)P$$

($\Delta$Hf)T: quantity of crystal fusion heat of total block copolymer (cal/g)

($\Delta$Hf)P: quantity of crystal fusion heat of propylene homopolymer portion (cal/g)

The ethylene content of the propylene-ethylene random copolymer portion can be determined by measuring the ethylene content of the total block copolymer by an infrared absorption spectrum method in terms of % by weight and calculating according the following equation.

$$(C2')EP=(C2')T/X$$

(C2')T: ethylene content (% by weight) of total block copolymer (C2')EP: ethylene content (% by weight) of propylene-ethylene random copolymer portion Further, in the propylene-ethylene block copolymer, the intrinsic viscosity [$\eta$]EP of the propylene-ethylene random copolymer portion can be calculated according to the following equation by measuring each intrinsic viscosity of the homopolymer portion and total block copolymer.

$$[\eta]EP=[\eta]T/X-(1/X-1)[\eta]P$$

[$\eta$]P: intrinsic viscosity (dl/g) measured in tetralin solution at 135° C. of propylene homopolymer portion

[$\eta$]: intrinsic viscosity (dl/g) measured in tetralin solution at 135° C. of total block copolymer The amounts of the polypropylene-based resin (B) and the graft copolymer rubber (A) are 60 to 95% by weight and 5 to 40% by weight, preferably 70 to 93% by weight and 7 to 30% by weight (provided that the total of (A) and (B) is 100% by weight), respectively. When the amount of the graft copolymer rubber(A) is less than 5% by weight or more than 40% by weight, preferable result can not be obtained in the balance between rigidity and impact strength.

Further, a known ethylene-α-olefin-based copolymer rubber and/or alkenyl aromatic compound-containing rubber can be optionally added to the composition of the present invention for the purpose of improving balance in other physical properties such as molding property and the like.

The ethylene-α-olefin-based copolymer rubber herein used is ethylene-α-olefin copolymer rubber, ethylene-α-olefin-non-conjugated diene copolymer rubber or the like.

Examples of the α-olefin component in the ethylene-α-olefin-based copolymer rubber include α-olefins having 3 to 12 carbon atoms such as propylene, butene-1, pentene-1, octene-1 and the like. Examples of the non-conjugated diene as a third component include 5-ethylidene-2-norbornene, dicyclopentadiene, 1,4-hexadiene and the like. Specific example of the ethylene-α-olefin-based copolymer rubber include ethylene-propylene copolymer rubber, ethylene-butene-1 copolymer rubber, ethylene-octene-1 copolymer rubber, ethylene-propylene-5-ethylidene-2-norbornene terpolymer rubber, ethylene-propylene-dicyclopentadiene terpolymer rubber and the like.

The ethylene-α-olefin-based copolymer rubber may be used as alone or in combination of two or more.

As the alkenyl aromatic compound-containing rubber, there may be listed rubber in which an alkenyl aromatic compound is bonded by polymerization, reaction or the like to olefin-based copolymer rubber or conjugated diene rubber, for example, block copolymers and random copolymers such as styrene-butadiene random copolymer rubber (SBR), styrene-butadiene-styrene block copolymer rubber (SBS), styrene-isoprene-styrene block copolymer rubber (SIS) or the like, or hydrogenated products obtained by hydrogenating the diene component in these block copolymers, random copolymers or the like.

The alkenyl aromatic compound content in the alkenyl aromatic compound-containing rubber is usually 1 to 50% by weight, preferably 5 to 40% by weight.

The alkenyl aromatic compound-containing rubber may be used in combination of two or more.

The preferable amount of ethylene-α-olefin-based copolymer rubber and/or alkenyl aromatic compound-containing rubber added is 3 to 50 parts by weight based on 100 parts by weight of the polypropylene-based resin composition. When it is over 50 parts by weight, preferable result may sometimes not be obtained regarding rigidity.

An inorganic filler can be optionally used together with the composition of the present invention. The inorganic filler which can be used in the present invention may advantageously be one which improves rigidity and heat resistance, and examples thereof include calcium carbonate, mica, crystalline calcium silicate, talc, glass fiber and the like. Talc and glass fiber are particularly preferable.

The talc usually has an average particle size of 4 $\mu$m or less, preferably 3 $\mu$m or less. When more than 4 $\mu$m, decrease in impact strength is large, and appearance such as gloss and the like tends to deteriorate. The talc may be used without treatment, and there can also be used that of which surface is treated with a surface treating agent selected from silane coupling agents, titanium coupling agents, higher fatty acids, higher fatty acid esters, higher fatty acid amides, higher fatty acid salts or other surfactants which are usually used for improving interfacial adhesion with a propylene-based resin or for improving dispersability.

The average particle size of the talc means 50% equivalent particle size D50 calculated from integration distribution curve of an under sieve method measured by suspending the talc in a dispersing medium such as water, an alcohol or the like using a centrifugal sedimentation type particle size distribution measuring instrument.

The amount of the inorganic filler added is 40 parts by weight or less based on 100 parts by weight of a polypropylene-based resin composition. When the amount is more than 40 parts by weight, the impact strength of the composition lowers.

The composition of the present invention can be produced by using a kneading machine such as a single screw extruder, twin screw extruder, Banbury mixer, heat roll or the like. The mixing of each component may be conducted at one time or in several portions. As the method of adding in several portions, there may be a method in which after kneading of an inorganic filler with a polypropylene-based resin, then, a graft copolymer rubber, an optional ethylene-α-olefin-non-conjugated diene terpolymer rubber and/or alkenyl aromatic compound-containing rubber is added, and a method in which an inorganic filler has been previously kneaded in high concentration with a polypropylene-based resin to prepare a master batch, and the master batch is kneaded with diluting with the polypropylene-based resin, a graft copolymer rubber and an optional ethylene-α-olefin-non-conjugated diene terpolymer rubber and/or alkenyl aromatic compound-containing rubber.

Further, as the second method of addition in several portions, there may be a method in which a graft copolymer rubber, an optional ethylene-α-olefin-non-conjugated diene terpolymer rubber and/or alkenyl aromatic compound-containing rubber has been previously kneaded with a polypropylene-based resin to prepare a master batch, and to this are added the remained polypropylene-based resin and an inorganic filler and the mixture is kneaded.

As the third method of addition in several portions, there may be a method in which a polypropylene-based resin with an inorganic filler, and a polypropylene-based resin with a graft copolymer rubber and optional ethylene-α-olefin-non-conjugated diene terpolymer rubber and/or alkenyl aromatic compound-containing rubber are respectively kneaded, and finally, they are combined and kneaded. The temperature required for the kneading is usually 170 to 250° C., and the time required for the kneading is usually 1 to 20 minutes. Among them, the method in which a graft copolymer rubber, an optional ethylene-α-olefin-non-conjugated diene terpolymer rubber and/or alkenyl aromatic compound-containing rubber are previously kneaded with a polypropylene-based resin to prepare a master batch, and to this are added the remained polypropylene-based resin and an inorganic filler, and the mixture is kneaded, is particularly preferable.

Further, in these kneading machines, additives such as antioxidants, ultraviolet light absorbers, lubricants, pigments, antistatic agents, copper harm preventing agents, flame retardants, neutralizing agents, foaming agents, plasticizers, nucleating agents, bubble preventing agents, crosslinking agents and the like can be optionally appropriately compounded in addition to these basic components.

The polypropylene-based resin composition of the present invention can be made into an injection molded article by a conventional injection molding. The composition is suitably used particularly as a molded article for automobile and domestic electric appliances.

EXAMPLE

The present invention is explained using Examples, but not limited thereto.

Measuring methods of properties in the Examples are shown below.

(1) Melt Flow Rate (MFR)

It is measured according to JIS-K-6758 at a temperature of 230° C. under a load of 2.16 kg.

(2) Bending Test

It is conducted according to JIS-K-7203. A test piece molded by injection molding is used. The thickness of the test piece is 6.4 mm, and bending modulus is evaluated under conditions of a span length of 100 mm and a load speed of 2.0 mm/min. The measuring temperature is 23° C.

(3) Brittleness Temperature

It is measured according to JIS-K-6758. A specimen of 6.3×38×2 mm punched from a flat plate of 25×150×2 mm molded by injection molding, is used.

(4) Ethylene Content, Propylene Content

The ethylene content or propylene content was determined according to a calibration curve method using absorbance of characteristic absorption of a methyl group or a methylene group, which appear in the infrared absorption spectrum of a pressed sheet.

(5) Intrinsic Viscosity

The reduced viscosities were measured at three concentrations of 0.1, 0.2 and 0.5 g/dl by using an Ubbelohde viscometer. The intrinsic viscosity was determined by a calculation method described in "Polymer solution, Polymer Experiment, Vol. 11" (published by Kyoritsu Shuppan Co., Ltd., 1982), page 491, i.e. an extrapolation method which comprises plotting the reduced viscosities to the concentrations and extrapolating the viscosity at a concentration to zero. Regarding the polypropylene-based resin, the intrinsic viscosity was measured at a temperature of 135° C. by using a tetralin solution as a solvent. The intrinsic viscosity of the ethylene-α-olefin copolymer rubber (a) was measured at a temperature of 70 ° C. by using xylene as a solvent.

(6) Molecular weight distribution (Q value) was measured by gel permeation chromatography (GPC), and Q value was calculated as follows.

(a) Polypropylene-based resin
GPC: 150° C. type manufactured by Water Corp.
Column: two Shodex 80 MA manufactured by Showa Denko K.K.
Sample amount: 300 μl (polymer concentration 0.2% by weight)
Flow rate: 1 ml/min
Temperature: 135° C.
Solvent: o-dichlorobenzene A calibration curve of elution volume against molecular weight was made using a standard polystyrene manufactured by Tosoh Corp. The weight average molecular weight(Mw) and number average molecular weight(Mn) were calculated in terms of the sample polystyrene using the calibration curve, and weight average molecular weight(Mw)/number average molecular weight(Mn) equal to Q value) was calculated as a measure of molecular weight distribution.

(b) Ethylene-α-olefin-non-conjugated diene terpolymer rubber
GPC: 150° C. type manufactured by Water Corp.
Column: one Shodex 80 MA manufactured by Showa Denko K.K.
Sample amount: 300 μl (polymer concentration 0.2% by weight)
Flow rate: 1 ml/min
Temperature: 145° C.
Solvent: o-dichlorobenzene A calibration curve of elution volume against molecular weight was made using a standard polystyrene manufactured by Tosoh Corp. The weight average molecular weight(Mw) and number average molecular weight (Mn) were calculated in terms of the sample polystyrene using the calibration line, and Q value=weight average molecular weight(Mw)/number average molecular weight(Mn) was calculated as a measure of molecular weight distribution.

(7) Mooney Viscosity

It was measured according to JIS-K-6300. The measuring temperature is 100° C.

The test pieces for evaluations in (2), (3) and (4) were prepared under the following injection molding conditions unless otherwise stated. A composition was dried at 120° C. for 2 hours in a hot air drier, then injection molding was effected using an IS150E-V type injection molding machine manufactured by Toshiba Machine Co., Ltd. at a molding (molten resin) temperature of 220° C., a mold cooling temperature of 50° C., an injection time of 15 sec and a cooling time of 30 sec.

Abbreviations are defined as follows.
BC: propylene-ethylene block copolymer
PP: propylene homopolymer
EPDM: ethylene-propylene-non-conjugated diene terpolymer rubber
G-EPDM: graft copolymer rubber
ENB: 5-ethylidene-2-norbornene
DCPD: dicyclopentadiene Production of Graft Copolymer Rubber A graft copolymer rubber was produced by an aqueous suspension polymerization according to the following method referring to a method described in Example 1 of JP-B-62-10565.

Example 1

In a 5-liter-autoclave equipped with a stirrer; 2700 ml of water in which 6g of Pluronic F68 (trade name, manufactured by Asahi Denka Kogyo K.K.) as a dispersant was dissolved, and 600 g of EPDM (diene: DCPD, Mooneyviscosity at 100° C.: 43, Q value: 7.2) cut into small pieces (4–6mesh) were charged and stirred to obtain a suspension liquor. Next, 6.0 g of Sunperox TO-100 (trade name, manufactured by Sanken Kako Corp.) as a free radical initiator and 150 g of styrene monomer were added thereto, and then heated to 110° C. taking 75 minutes. The temperature of 110° C. was kept for 1 hour to proceed graft-polymerization. The rubber particles formed did not adhere each other during suspension polymerization. The resulting graft copolymer rubber particles were washed with water, and then dried under vacuum. (G-EPDM-1)

Comparative Example 1

A graft copolymer rubber was prepared in the same manner as in Example 1 above except that EPDM (diene: ENB, Mooney viscosity at 100° C.: 85, Q value: 3.3) was used instead of EPDM (diene: DCPD, Mooney viscosity at 100° C.: 43, Q value: 7.2). The resulting rubber particles did not adhere each other during suspension polymerization. (G-EPDM-2)

Comparative Example 2

A graft copolymer rubber was prepared in the same manner as in Example 1 above except that EPDM (diene: ENB, Mooney viscosity at 100° C.: 50, Q value: 2.5) was used instead of EPDM (diene: DCPD, Mooney viscosity at 100° C.: 43, Q value: 7.2). During suspension polymerization, the resulting rubber particles adhered each other and as the result, production of a graft copolymer rubber was impossible. (G-EPDM-3)

Comparative Example 3

A graft copolymer rubber was prepared in the same manner as in Example 1 above except that EPDM (diene. DCPD, Mooney viscosity at 100° C.: 55, Q value: 4.6) was used instead of EPDM (diene: DCPD, Mooney viscosity at 100° C.: 43, Q value: 7.2).

During the polymerization, the resulting rubber particles partially adhered each others, however, production of the graft copolymer rubber was possible. (G-EPDM-4)

The results are shown in Table 1.

Example 2 and Comparative Examples 4 and 5

Production of polypropylene-based resin composition and evaluation of physical properties thereof The following compositions were produce under conditions as described below unless otherwise stated. A propylene homopolymer having an intrinsic viscosity [$\eta$] of 1.36 described in Table 2 and a graft copolymer rubber described in Table 1 (G-EPDM-1, G-EPDM-2 or G-EPDM-4) was previously kneaded at a high rubber concentration with a Banbury mixer manufactured by Kobe Steel, Ltd. for 10 minutes at 80 rpm and the mixture was made into sheet form with a sheeting roll, then, the sheet was processed into a pellet of a master batch with a sheet pelletizer. The composition of each master batch is shown in Table 3.

This master batch and a propylene-based resin and 0.2 parts by weight of p-tert butyl aluminum benzoate as a nucleating agent per 100 parts by weight of the total of the master batch and the propylene-based resins, were uniformly pre-mixed with a Henschel mixer and tumbler mixer in composition described in Table 4, then, extruded through a twin screw kneading extruder (TEX44SS 30BW-2V type: manufactured by The Japan Steel Works, Ltd.) at an extrusion rate of 30 kg/hr and a screw rotation of 900 rpm under bent suction.

In Example 2, a polypropylene-based resin composition prepared by adding G-EPDM-1 to a polypropylene-based resin as used.

In Comparative Example 4, a polypropylene-based resin composition prepared by adding G-EPDM-2 to a polypropylene-based resin was used.

In Comparative Example 5, a polypropylene-based resin composition prepared by adding G-EPDM-4 to a polypropylene-based resin was used.

These results are shown in Table 5.

From comparison of these results, it is known that the composition of Example 2 (G-EPDM-1 was used) is excellent in balance between flexural modulus and brittleness temperature and in flowability as compared with those of Comparative Examples 4 and 5 (G-EPDM-2 and G-EPDM-4 were used respectively).

TABLE 1

| | Rubber | Mooney viscosity of EPDM before grafting | Q value of EPDM before grafting | Diene | Styrene content (wt %) | Graft polymerization result |
|---|---|---|---|---|---|---|
| Example 1 | G-EPDM-1 | 43 | 7.2 | DCPD | 20 | Good without adhering to each other |
| Comparative example 1 | G-EPDM-2 | 85 | 3.3 | ENB | 20 | Good without adhering to each other |
| Comparative example 2 | G-EPDM-3 | 50 | 2.5 | ENB | 20 | Polymerization is impossible because of adhering to each other |
| Comparative example 3 | G-EPDM-4 | 55 | 4.6 | DCPD | 20 | Polymerization is possible though partially adhering to each other |

TABLE 2

| | [$\eta$]P (dl/g) | [$\eta$]EP (dl/g) | (C2')EP (wt %) | EP content (wt %) | Isotatic pentad fraction |
|---|---|---|---|---|---|
| BC | 1.17 | 4.3 | 42.0 | 16.6 | 0.98 |
| PP | 1.36 | — | — | — | 0.98 |

TABLE 3

|      | Composition (Part by weight) |
|------|------------------------------|
| MB-1 | PP/G-EPDM-1 50/50            |
| MB-2 | PP/G-EPDM-2 50/50            |
| MB-3 | PP/G-EPDM-4 50/50            |

TABLE 4

|                     | Composition (Part by weight) |
|---------------------|------------------------------|
| Example 2           | BC/PP/MB-1 50/30/20          |
| Comparative example 4 | BC/PP/MB-2 50/30/20        |
| Comparative example 5 | BC/PP/MB-3 50/30/20        |

TABLE 5

|                       |           | MFR | Flexural modulus | Brittleness temperature |
|-----------------------|-----------|-----|------------------|-------------------------|
| Example 2             | G-EPDM-1  | 28  | 14300            | −10                     |
| Comparative example 4 | G-EPDM-2  | 20  | 13900            | −5                      |
| Comparative example 5 | G-EPDM-4  | 23  | 14400            | −4                      |

According to the method in which a graft copolymer rubber is produced in an aqueous suspension of the present invention, rubber particles do not adhere each other in production, and when the graft copolymer rubber is added to a polypropylene-based resin, a polypropylene-based resin composition excellent in rigidity, impact resistance and flowability is given.

What is claimed is:

1. A method for producing a graft copolymer rubber which comprises graft-polymerizing an alkenyl aromatic compound to an ethylene-α-olefin dicyclopentadiene terpolymer rubber having a Q value of more than 5.0 and a Mooney viscosity at 100° C. of 70 or less, in an aqueous suspension in the presence of a free radical initiator and a dispersant, wherein the alkenyl aromatic content in the graft copolymer rubber is from about 5 to 30% by weight.

2. The method according to claim 1, wherein the alkenyl aromatic compound is styrene.

3. The method according to claim 1, wherein the alkenyl aromatic compound content in the graft copolymer rubber is from 10 to 25% by weight.

4. The method according to claim 1, wherein the Q value of the ethylene-α-olefin-dicyclopentadiene terpolymer is 6.0 or more.

5. A polypropylene-based resin composition comprising:
5 to 40% by weight of a graft copolymer rubber (A) obtained by graft-polymerizing an alkenyl aromatic compound to an ethylene-α-olefin-dicyclopentadiene terpolymer rubber having a Q value of more than 5.0 and a Mooney viscosity at 100° C. of 70 or less, in an aqueous suspension in the presence of a free radical initiator and a dispersant; and
60 to 95% by weight of a polypropylene-based resin (B) selected from the group consisting of (i) a crystalline propylene homopolymer having a Q value of 3.0 to 5.0, isotactic pentad fraction of 0.97 or more and intrinsic viscosity measured in tetralin solution at 135° C. of 0.85 to 1.60 dl/g, (ii) a crystalline propylene-ethylene block copolymer composed of 60 to 95% by weight of a propylene homopolymer portion having a Q value of 3.0 to 5.0, isotactic pentad fraction of 0.97 or more and intrinsic viscosity measured in tetralin solution at 135° C. of 0.85 to 1.60 dl/g and 5 to 40% by weight of a propylene-ethylene random copolymer portion having an ethylene content of 25 to 55% by weight, and a mixture of (i) and (ii) (provided that the total of (A) and (B) is 100% by weight), wherein the alkenyl aromatic content in the graft copolymer rubber is from about 5 to 30% by weight.

6. The polypropylene-based resin composition according to claim 5, wherein the polypropylene-based resin is said crystalline propylene-ethylene block copolymer (ii) or a mixture of said crystalline propylene homopolymer (i) and said crystalline propylene-ethylene block copolymer (ii).

7. The polypropylene-based resin composition according to claim 5, wherein the alkenyl aromatic compound is styrene.

8. The polypropylene-based resin composition according to claim 5, wherein the alkenyl aromatic compound content in the graft copolymer rubber is from 10 to 25% by weight.

9. The polypropylene-based resin composition according to claim 5, wherein the intrinsic viscosity of the propylene-ethylene random copolymer portion is 2.5 to 12 dl/g.

10. The method according to claim 1, wherein the dispersant is selected from the group consisting of polyvinyl alcohols, cellulose compounds, acrylic acid compounds, inorganic salts and alkylene oxides.

11. The method according to claim 1, wherein the free radical initiator is selected from the group consisting of benzoyl peroxide, lauroyl peroxide, tert-butyl peroxide pivalate, tert-butyl peroxy-2-ethylhexanoate, tert-butyl hydroxide, dicumyl peroxide, azobisisobutyronitrile and azobisdimethylvaleronitrile.

12. The method according to claim 5, wherein the dispersant is selected from the group consisting of polyvinyl alcohols, cellulose compounds, acrylic acid compounds, inorganic salts and alkylene oxides.

13. The method according to claim 5, wherein the free radical initiator is selected from the group consisting of benzoyl peroxide, lauroyl peroxide, tert-butyl peroxide pivalate, tert-butyl peroxy-2-ethylhexanoate, tert-butyl hydroxide, dicumyl peroxide, azobisisobutyronitrile and azobisdimethylvaleronitrile.

14. The method according to claim 1, whereon the α-olefin has 3 to 12 carbon atoms.

15. The method according to claim 1, whereon the α-olefin has 3 to 12 carbon atoms.

16. The composition according to claim 5, further comprising an inorganic filler selected from the group consisting of calcium carbonate, mica, crystalline calcium silicate, talc and glass fiber.

17. The composition according to claim 16, wherein the talc has an average particle size of about 4 μm or less.

18. The composition according to claim 16, wherein the talc has been treated with a surface treating agent.

* * * * *